(12) United States Patent
Avida et al.

(10) Patent No.: US 7,944,936 B2
(45) Date of Patent: *May 17, 2011

(54) STREAM-ORIENTED INTERCONNECT FOR NETWORKED COMPUTER STORAGE

(75) Inventors: Dan Avida, Belmont, CA (US); Serge Plotkin, Palo Alto, CA (US)

(73) Assignee: NetApp, Inc., Sunnyvale, CA (US)

( * ) Notice: Subject to any disclaimer, the term of this patent is extended or adjusted under 35 U.S.C. 154(b) by 852 days.

This patent is subject to a terminal disclaimer.

(21) Appl. No.: 11/426,258

(22) Filed: Jun. 23, 2006

(65) Prior Publication Data

US 2006/0233170 A1 Oct. 19, 2006

Related U.S. Application Data

(63) Continuation of application No. 10/477,974, filed as application No. PCT/US02/15727 on May 16, 2002, now Pat. No. 7,069,375.

(60) Provisional application No. 60/292,106, filed on May 17, 2001.

(51) Int. Cl.
  *H04L 12/28* (2006.01)

(52) U.S. Cl. ........................................ 370/415

(58) Field of Classification Search .................. 370/389, 370/415, 420; 709/221; 710/52, 104, 305, 710/310, 316

See application file for complete search history.

(56) References Cited

U.S. PATENT DOCUMENTS

| | | | |
|---|---|---|---|
| 2,004,006 A | 6/1935 | McKeon | |
| 4,811,210 A | 3/1989 | McAulay | |
| 5,091,905 A * | 2/1992 | Amada | 370/415 |
| 5,179,552 A | 1/1993 | Chao | |
| 5,289,303 A * | 2/1994 | Cloonan et al. | 398/54 |
| 5,535,348 A | 7/1996 | Leach et al. | |
| 5,553,095 A | 9/1996 | Engdahl et al. | |
| 5,586,264 A | 12/1996 | Belknap et al. | |
| 5,594,914 A | 1/1997 | Coomes et al. | |
| 5,602,964 A | 2/1997 | Barrett | |

(Continued)

FOREIGN PATENT DOCUMENTS

EP 709988 5/1996

(Continued)

OTHER PUBLICATIONS

Avida et al., "Stream-Oriented Interconnect for Networked Computer Storage", filed as U.S. Appl. No. 60/292,106 on May 17, 2001, 7 pages.

(Continued)

*Primary Examiner* — Man Phan
*Assistant Examiner* — Nourali Mansoury
(74) *Attorney, Agent, or Firm* — Cesari and McKenna, LLP

(57) ABSTRACT

An apparatus and method for connecting a plurality of computing devices, e.g. web servers, database servers, etc., to a plurality of storage devices, such as disks, disk arrays, tapes, etc., by using a stream-oriented (circuit oriented) switch that has high throughput, but that requires non-negligible time for reconfiguration is disclosed. An example of such stream-oriented switch is an optical switch. The system decodes the requests from the computing devices and uses this information to create circuits, e.g. optical paths in embodiments where the stream-oriented switch is an optical switch, through the stream-oriented switch. The system uses these circuits to route traffic between the computing devices and the storage devices. Buffering of data and control in the device memory is used to improve overall throughput and reduce the time spent on reconfigurations.

24 Claims, 3 Drawing Sheets

U.S. PATENT DOCUMENTS

| | | | |
|---|---|---|---|
| 5,603,058 A * | 2/1997 | Belknap et al. | 710/35 |
| 5,825,772 A * | 10/1998 | Dobbins et al. | 370/396 |
| 5,983,303 A | 11/1999 | Sheafor et al. | |
| 6,016,535 A | 1/2000 | Krantz et al. | |
| 6,064,805 A | 5/2000 | McCrory et al. | |
| 6,088,729 A | 7/2000 | McCrory et al. | |
| 6,088,753 A | 7/2000 | Sheafor et al. | |
| 6,141,737 A | 10/2000 | Krantz et al. | |
| 6,157,614 A | 12/2000 | Pastermark et al. | |
| 6,366,559 B1 * | 4/2002 | Krishnan et al. | 370/230 |
| 6,441,935 B1 * | 8/2002 | Araki et al. | 398/52 |
| 6,490,252 B1 * | 12/2002 | Riggan et al. | 370/237 |
| 6,550,057 B1 | 4/2003 | Bowman-Amuah | |
| 6,665,495 B1 * | 12/2003 | Miles et al. | 398/54 |
| 6,731,990 B1 * | 5/2004 | Carter et al. | 700/52 |
| 6,768,992 B1 | 7/2004 | Jolitz | |
| 6,804,232 B1 | 10/2004 | Donaghey | |
| 6,842,906 B1 | 1/2005 | Bowman-Amuah | |
| 6,850,252 B1 | 2/2005 | Hoffberg | |
| 6,865,151 B1 * | 3/2005 | Saunders | 370/230 |
| 6,889,385 B1 | 5/2005 | Rakib et al. | |
| 6,907,466 B2 | 6/2005 | Alexander, Jr. et al. | |
| 6,920,501 B2 | 7/2005 | Chu et al. | |
| 6,928,470 B1 * | 8/2005 | Hamlin | 709/223 |
| 6,993,661 B1 | 1/2006 | Garfinkel | |
| 7,069,375 B2 | 6/2006 | Avida et al. | |
| 7,594,249 B2 * | 9/2009 | Gurantz et al. | 725/78 |
| 2002/0010679 A1 | 1/2002 | Felsher | |
| 2002/0080775 A1 | 6/2002 | Engbersen et al. | |
| 2002/0085574 A1 | 7/2002 | Kerr et al. | |
| 2002/0087709 A1 | 7/2002 | Kerr et al. | |
| 2002/0143929 A1 * | 10/2002 | Maltz et al. | 709/224 |
| 2002/0169604 A1 * | 11/2002 | Damiba et al. | 704/231 |
| 2003/0053475 A1 | 3/2003 | Veeraraghavan et al. | |
| 2003/0088689 A1 | 5/2003 | Alexander, Jr. et al. | |
| 2003/0182419 A1 | 9/2003 | Barr et al. | |
| 2004/0044874 A1 | 3/2004 | Leach et al. | |
| 2004/0158623 A1 | 8/2004 | Avida et al. | |
| 2004/0172658 A1 | 9/2004 | Rakib et al. | |
| 2004/0205110 A1 | 10/2004 | Hinshaw | |
| 2004/0208172 A1 | 10/2004 | Ovadra et al. | |
| 2005/0038936 A1 | 2/2005 | Barry et al. | |
| 2005/0053065 A1 | 3/2005 | Donaghey | |
| 2005/0890247 | 4/2005 | Colton | |
| 2005/0204122 A1 | 9/2005 | Phillips et al. | |
| 2005/0254106 A9 | 11/2005 | Silverbrook et al. | |

FOREIGN PATENT DOCUMENTS

| | | |
|---|---|---|
| EP | 1 117 214 | 7/2001 |
| EP | 0 958 688 | 8/2002 |
| EP | 0 622 713 | 6/2004 |
| EP | 1 070 407 | 11/2004 |
| EP | 1 589 433 | 10/2005 |
| WO | WO 98/35479 | 8/1998 |
| WO | WO 98/54651 | 12/1998 |
| WO | WO 01/16724 | 3/2001 |
| WO | WO 01/16734 | 3/2001 |
| WO | WO 01/17195 | 3/2001 |
| WO | WO 01/82635 | 11/2001 |
| WO | WO 01/93526 | 12/2001 |
| WO | WO 02/093389 | 11/2002 |
| WO | WO 2004/027576 | 4/2004 |

OTHER PUBLICATIONS

Anderson, T. et al.; Serverless Network File Systems; Computer Science Division, University of California at Berkeley, Dec. 1995, Feb. 1996.

Asami, S. et al.; The Design of Large-Scale, Do-It-Yourself RAIDS; Computer Science Division, University of California, 1995.

Blaze, M.; A Cryptographic File System for Unix; AT&T Bell Laboratories; mab@research.att.com, Nov. 3-5, 1993.

Borisov, N. et al.; SURFS: A Secure Remote Filesystem; Berkeley; Dec. 16, 1998.

Boulkenafed, M. et al.; Coherency Management in Ad-Hoc Group Communication; Inria-Rocquencourt, 2002.

Brodsky, D. et al.; Using File-Grain Connectivity to Implement a Peer-to-Peer File System; Department of Computer Science, University of British Columbia, 2002.

Burns, R.C. et al.; Semi-Preemptible Locks for a Distributed File System; Department of Computer Science, IBM Almaden Research Center, Feb. 2000.

Disz, T. et al.; Performance Model of the Argonne Voyager Multimedia Server; Mathematics and Computer Science Division, Argonne National Laboratory, Argonne, IL, 1997.

Gibson, G. et al.; Filesystems for Network-Attached Secure Disks; School of Computer Science, Carnegie Mellon University, Pittsburgh, PA; Jul. 1997.

Gopalakrishnan, S. et al.; Federated File Systems for Clusters with Remote Memory Communication; Department of Computer Science, Rutgers University, Piscataway, NJ, 2002.

Hulen, H. et al.; Storage Area Networks and the High Performance Storage System; IBM Global Services, Houston, TX, 2002.

Ji et al.; Design and Implementation of An Island-Based File System, 1999.

Kim et al.; Safety, Visibility, and Performance in a Wide-Area File System; Electrical Engineering and Computer Science, University of Michigan, 2002.

Ludwig, S. et al.; File System Encryption with Integrated User Management; Corporate Technology, Siemens AG, Munich, Oct. 2001.

Mann, T. et al.; A Coherent Distributed File Cache with Directory Write-Behind; Digital Systems Research Center, Palo Alto, CA; Jun. 10, 1993.

Santry, D. et al.; Elephant: The File System that Never Forgets; Department of Computer Science, University of British Columbia, Vancouver, Canada, Mar. 1999.

Sengupta et al; "Switched Opticle Backbone for Cost-Effective Scalable Core IP Networks" (abstract only) Publication Date: Jun. 2003. Stream Oriented and Interconnect—Research Index Document Query; http://citeseer.ist.psu.edu/cs?cs=1& q=stream+oriented+and+interco...it=Documents&co=Citations& cm=50&cf=Any&ao=Citations&am=20&af=Any, Nov. 29, 2005.

Teaff, D. et al., The Architecture of the High Performance Storage System (HPSS); IBM Federal, Houston, TX, 1995.

Thekkath, C. et al.; Frangipani: A Scalable Distributed File System; Systems Research Center, Digital Equipment Corporation, Palo Alto, CA, Dec. 1997.

Triantafillou, P. et al.; Achieving Strong Consistency in a Distributed File System; IEEE Transactions on Software Engineering, vol. 23, No. 1; Jan. 1997.

Triantafillou, P. et al.; Efficient Massive Sharing of Content Among Peers; Department of Electronics and Computer Engineering, Technical University of Crete, Chania, Greece, Jul. 2-Jul. 5, 2002.

Ulmer, C. et al.; Active SANs: Hardware Support for Integrating Computation and Communication, Feb. 2, 2002.

White, B. et al.; Legion FS: A Secure and Scalable File System Supporting Cross-Domain High-Performance Applications; Department of Computer Science, University of Virginia. Charlottesville, VA, Nov. 2001.

Wong, J. et al.; The H-Bus: A Media Acquisition Bus Optimized for Multiple Streams; MIT Media Laboratory, Cambridge, MA, Jan. 17, 1997.

Bernabei, F. et al.; Distributed CBO Call Set-up in a Circuit Emulation ATM Switch; Proceedings IEEE INFOCOM '90. The Conference on Computer Communications. Ninth Annual Joint Conference of the IEEE Computer and Communication Societies. The Multiple Facets of Integration (Cat. No. 90CH2826-5) p. 330-7 vol. 2; IEEE Comput. Soc. Press, Los Alamitos, CA, USA; 1990.

Bernabei, F. et al.; A Fully Distributed Routing Control Scheme in an ATM Switch; IEEE International Conference on Communications ICC '90 Including Supercomm Technical Sessions. SUPERCOMM ICC '90 Conference Record (Cat. No. 90CH2829-0) p. 766-70 vol. 2; IEEE; New York, NY, USA; 1990.

Danthine, A.; A Backbone Wideband Network for LAN Interconnection on a Broad Site; Information Network and Data Communication, I. Proceedings of the IFIP TC 6 International Conference p. 155-71; North-Holland; Amsterdam, Netherlands; 1987.

Han Tao et al.; Implementation and Analysis of Stream-Oriented Protocol-Based RTP/RTCP within Video Conference; Proceedings of the SPIE—The International Society for Optical Engineering, vol. 3545 p. 286-9; SPIE-Int. Soc. Opt. Eng; 1998; USA.

* cited by examiner

STREAM-ORIENTED INTERCONNECT FOR NETWORKED COMPUTER STORAGE

CROSS REFERENCE TO RELATED APPLICATIONS

This application is a continuation of U.S. application Ser. No. 10/477,974 filed on Nov. 14, 2003 now U.S. Pat. No. 7,069,375, which is a national stage entry of PCT/US02/15727, filed on May 16, 2002, which itself claims priority from U.S. provisional application Ser. No. 60/292,106, filed on May 17, 2001, all of which are herein incorporated in their entirety by these references thereto.

BACKGROUND OF THE INVENTION

1. Technical Field

The invention relates to the storage of information. More particularly, the invention relates to a stream-oriented interconnect for networked computer storage.

2. Description of the Prior Art

The properties of typical traffic between computing devices and storage devices are fundamentally different from those of the typical flows between computing devices. For example, the latency between the time a request is issued for a disk read and/or write operation and the time the operation is performed by the disk can run into the multiple milliseconds due to factors such as disk seek time and disk rotational delays. As opposed to typical internet traffic, which tends to have short bursts of traffic to different servers, the traffic in a storage network tends to have significantly longer packets and, in many cases, is stream (circuit) oriented and predictable. In addition, while in general it is very important to minimize the latency in computer networks, the latency of write-to-disk operations is relatively unimportant in many cases.

Known stream-oriented switches, e.g. optical interconnects based on micro-mirrors, electro-optic, thermo-optic, acousto-optic, bubbles, etc., are capable of very high throughput but have relatively long switching/reconfiguration times. Conversely, conventional electronic packet switches have lower maximum throughput than optical switches, but have significantly faster switching times. Switching time, as used herein, refers to the time that elapses between a command to create a connection between ports and the time when the data can start flowing through the system.

It would be advantageous to provide an apparatus and method for connecting a plurality of computing devices, e.g. web servers, database servers, etc., to a plurality of storage devices, such as disks, disk arrays, tapes, etc., by using a stream-oriented (circuit oriented) switch that has high throughput, but that requires non-negligible time for reconfiguration.

SUMMARY OF THE INVENTION

The presently preferred embodiment of the invention comprises an apparatus and method for connecting a plurality of computing devices, e.g. web servers, database servers, etc., to a plurality of storage devices, such as disks, disk arrays, tapes, etc., by using a stream-oriented (circuit oriented) switch that has high throughput, but that requires non-negligible time for reconfiguration. An example of such stream-oriented switch is an optical switch.

The preferred embodiment comprises a plurality of communication ports for connection to servers, and a plurality of ports for connection to storage devices. The system decodes the requests from the computing devices and uses this information to create circuits, e.g. optical paths in embodiments where the stream-oriented switch is an optical switch, through the stream-oriented switch. The system uses these circuits to route traffic between the computing devices and the storage devices. Buffering of data and control in the device memory is used to improve overall throughput and reduce the time spent on reconfigurations.

An alternative embodiment of the system uses two interconnects, in which all devices are connected to one or both interconnects. One of the interconnects is the stream-oriented switch described above. The second interconnect is a conventional packet switch which can switch traffic on a packet-by-packet basis, e.g. electronic packet switch. In contrast to the stream-oriented switch, the packet switch has much smaller overall throughput, but requires much less time for reconfiguration. The stream-oriented switch is used for switching relatively large data streams, e.g. reading a large file, while the packet switch is used for control and the rest of the data traffic.

A further embodiment of the invention comprises a system that uses a statistical prediction algorithm, e.g. HMM, Hidden Markov Model, to predict traffic flows. It then uses a statistical decision algorithm, e.g. MDP, Markov Decision Process, to decide on how to reconfigure the stream-oriented switch at every moment in time. The system attempts to optimize certain customer selectable measures, such as throughput, latency, etc., by configuring the stream-oriented switch such that the selected measures are optimized for the predicted traffic, while routing the remainder of the traffic, i.e. the predicted traffic that could not be accommodated by the high-throughput interconnect, as well as the unpredicted traffic, through the packet switch.

DETAILED DESCRIPTION OF THE INVENTION

Networked Storage Using an Optical Switch

Figure 1:
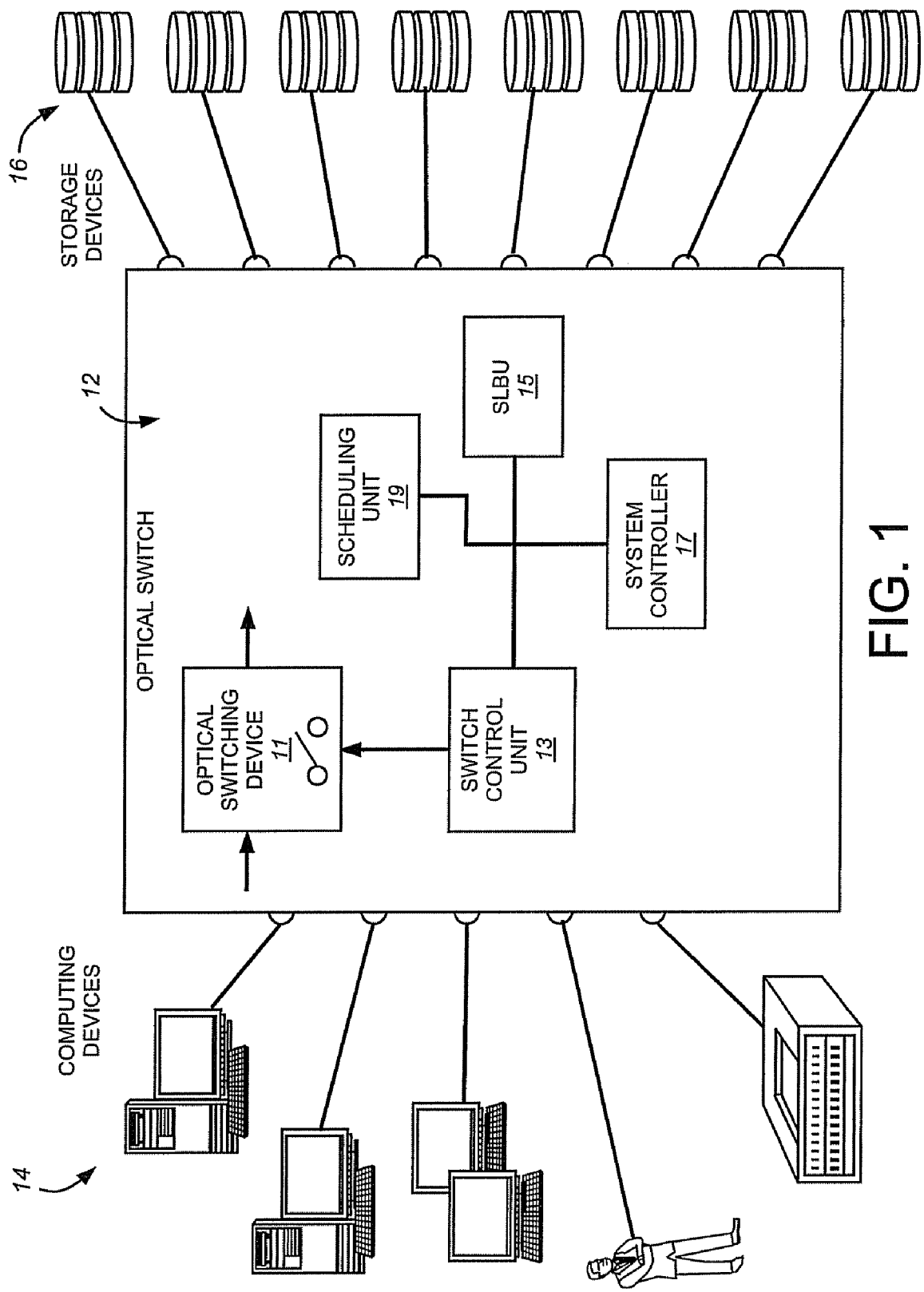
FIG. 1 is a block schematic diagram that shows device for switching storage-related data using an optical switch according to the invention.

As shown in FIG. 1, the herein disclosed invention, a stream-oriented, optical switch 12 (also referred to herein as an optical switch), connects a plurality of computing devices 14 to a plurality of storage devices 16. The presently preferred embodiment of the invention comprises an optical switching device 11, a switch control unit 13, a scheduling and load balancing unit (called hereinafter SLBU) 15, and a system controller 17.

The system controller 17 is responsible for the overall control of the entire system. It communicates with the computing and storage devices, gathering their request and monitoring status information. This information is distributed to the SLBU, which determines a performance enhancing packet schedule and routing as well as switch configuration.

The system controller then distributes the packet schedule, routing information, and stream-oriented switch configuration to the relevant parts of the system.

The SLBU is responsible for distributing the communication load between the various available links between the computing and storage devices. It is also responsible for ordering the packet flows through the system. It attempts to minimize frequency of stream-oriented switch reconfigurations. Such reconfigurations generally take time, thereby increasing latency, and decreasing throughput. SLBU is also concerned with providing quality-of-service to the computing and storage devices The packet scheduling unit 19 sends a transmission schedule to the computing and storage devices as well as to the system controller. Based on the information provided by the SLBU, the system controller determines when a switch configuration change is required, and sends a command to the switch control unit to modify the optical switch configuration. Once the optical switch has been reconfigured, the switch control unit informs the rest of the system of the new configuration, and the computing and storage devices commence using the circuits that are available through this new configuration for communicating.

A Multiple Fabric Switch for Connecting Computing and Storage Devices

In this embodiment of the invention, all devices are connected to one, two, or more interconnects, e.g. an electronic packet switch and an optical switch. The packet switch is used for some of the control and data traffic, while the optical switch is used for the remainder of the traffic. The multiple fabrics are controlled by the system control unit, which receives and issues control and status information via the packet switch and which is responsible for configuring the optical switch.

Figure 2:
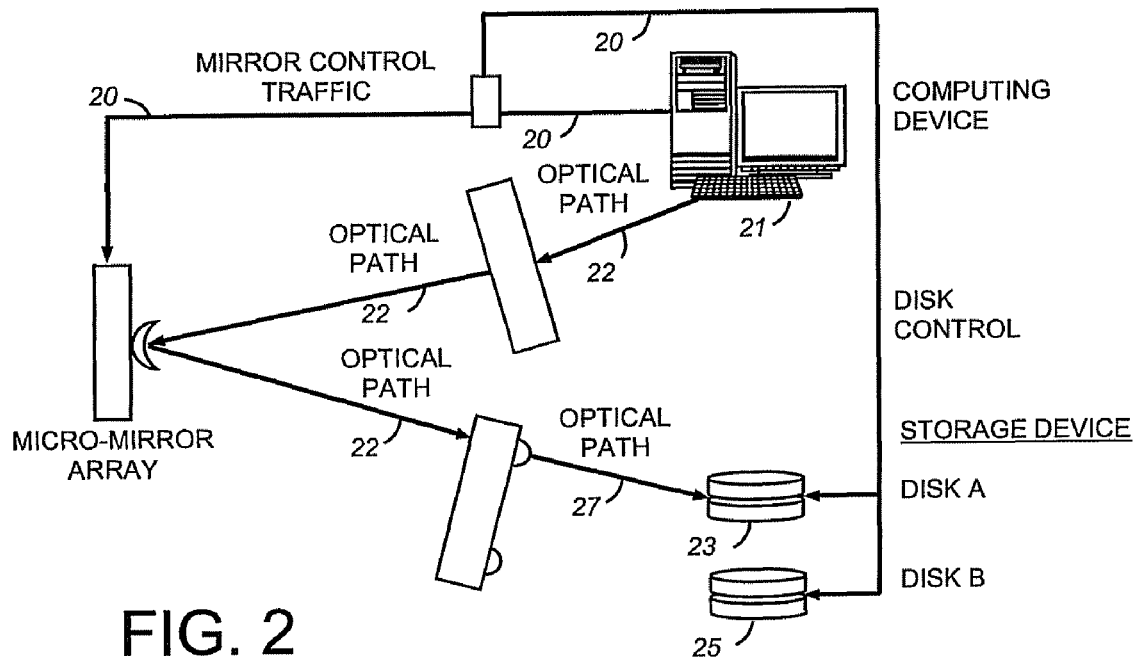
FIG. 2 is a block schematic diagram that shows section of a dual fabric interconnect according to the invention.

The system decodes the traffic and splits it in two. The control part of the traffic 20 is sent through the packet switch, while the rest of the traffic 22 is routed through the optical switch. A subsection of a system based on this invention with two interconnects is shown in FIG. 2, in which one computing device 21 is connected to two storage devices 23, 25 both through a packet switch, and a circuit created by an optical switch. In the system state illustrated in FIG. 2, the circuit (in the example, an optical path 22, 27) connects the computing device and Disk A.

Figure 3:
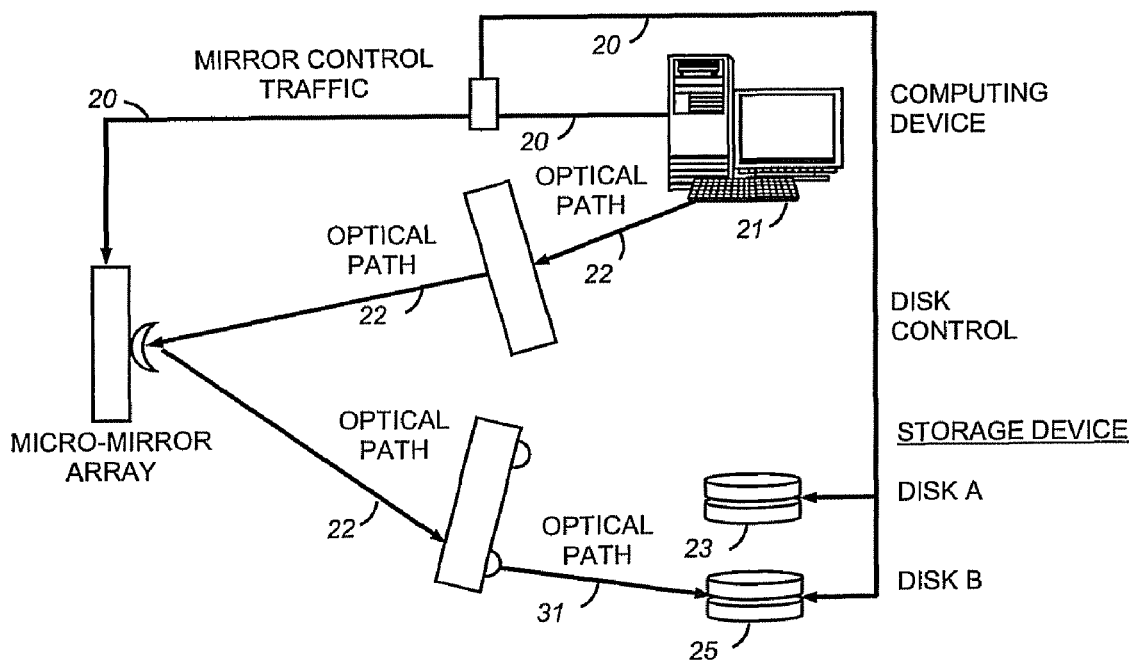
FIG. 3 is a block schematic diagram that shows a dual fabric section after an optical switch is switched to disk B according to the invention.

If the traffic flow changes and it becomes advantageous to create a circuit between the computing device and Disk B, the configuration of the optical switch is changed to the configuration that is shown in FIG. 3, where the optical switch implements a circuit (in this example, an optical path 22, 31) that connects the computing device and Disk B. While the system is in this configuration, the packets that need to be transmitted between the computing device and Disk A are flowing through the packet switch, illustrated by the arrows 20.

While two disks are shown in this example, those skilled in the art will appreciate that any number of storage devices may be used in connection with the herein disclosed invention. Similarly, those skilled in the art will be able to use an optical switch that supports multiple concurrent circuits as opposed to a single circuit shown in FIGS. 2 and 3.

This embodiment of the invention is controlled by a system controller that is responsible for the overall control of the system. It communicates with the computing and storage devices, gathering their request and status information, and distributing this information to the SLBU.

The SLBU is responsible for distributing the communication load between the various available links through the fabrics connecting the computing and storage devices. It recommends to the system controller unit a configuration of the optical switch and the packet switch that divides the traffic between the two fabrics to optimize certain customer selectable criteria such as throughput and delay.

Figure 4:
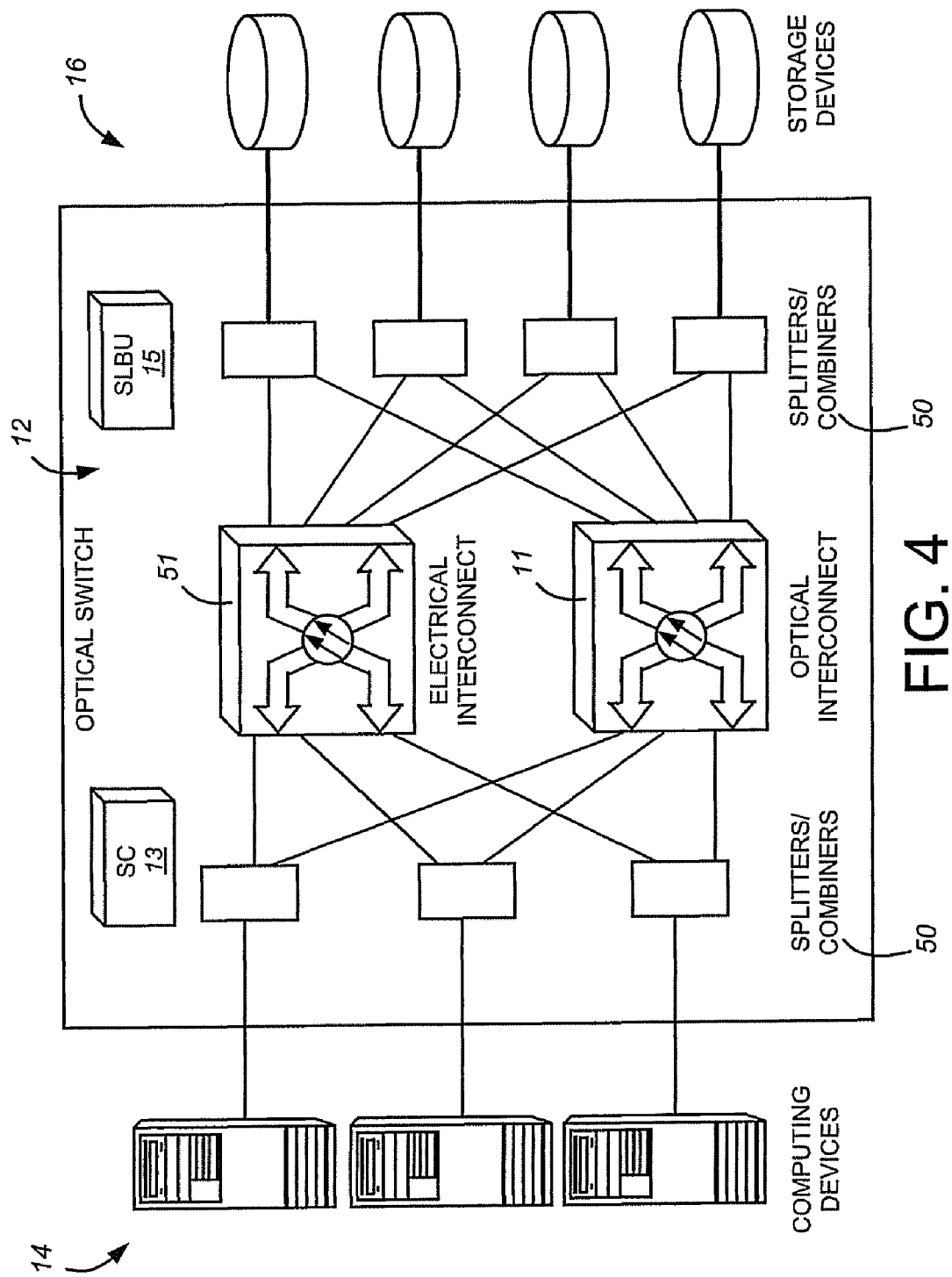
FIG. 4 is a block schematic diagram that shows a generalized overview of a dual fabric architecture according to the invention.

The SLBU is also responsible for ordering the packet flows through the system. It attempts to balance the frequency of optical switch reconfigurations (which, generally, take time, thereby increasing latency and decreasing throughput), with optimizing the customer-desired system attributes, e.g. total throughput. The SLBU communicates with the computing and storage devices for the most part via the packet switch. The SLBU sends a transmission schedule to the computing and storage devices, as well as to the system controller. (Alternatively, as shown in FIG. 4, SLBU can communicate with splitters/combiners making the switch look like a single-fabric switch from the point of view of the storage and the computer devices.) Based on the information provided by the SLBU, the system controller determines when an optical switch configuration change is required, and sends a command to the switch control unit to modify the optical switch configuration. This is shown in FIG. 2 by the arrow marked "mirror control."

Additionally, because in many cases a seek operation by the target disk device is required, such a command can be sent to the target via the packet switch in parallel with the reconfiguration of the optical switch. The arrow marked "disk control" illustrates this. Once the optical switch has been reconfigured, as illustrated in FIG. 3, the switch control unit informs the rest of the system of the new configuration, and the computing and storage devices commence communicating via this new configuration.

An overview of a presently preferred embodiment of the system is shown in FIG. 4. Packets sent from computing devices 14 are decoded by respective splitters/combiners 50 (one such device per port) and some control/status information is extracted and forwarded to the load balancer SLBU 15. The SLBU controls the state of the optical switch 11 (optical interconnect in this example) and instructs the load balancers/splitters which of the packets/streams should be routed through the optical switch, i.e. optical interconnect. The rest of the packets are routed through the packet switch 51 (in this example, the electrical interconnect). Splitters/combiners can be either part of the dual-fabric switch or embedded into computing and storage devices.

An example of a transaction in such a system is a read operation by a computing device. In such a case, the computing device issues a request for the data from a storage device. The read request is decoded by the appropriate splitter/combiner. It is immediately forwarded through the packet switch, e.g. electrical interconnect, to the appropriate storage device. At the same time, the information describing the request, e.g. number of bytes to be transmitted and source/destination, is forwarded to the load balancer. While the storage device performs the seek operation, the load balancer instructs the optical switch, e.g. the optical interconnect, to prepare a data path between the appropriate ports. When the path is prepared, it instructs the splitter/combiner responsible for the storage device port to route the data from the storage device through the optical switch. It also instructs the appropriate splitter/combiner on the server side to be ready for data that will shortly arrive from the optical switch. The splitter/combiner receives this data and forwards it to the computing device.

A similar procedure is executed for computing device writes to the storage devices. In general, the SLBU monitors the data streams that are passing through the system. It also monitors the overall throughput and the data transfers that are in progress, redirecting some of the transfers to pass through the optical switch, e.g. optical interconnect. The rest of the data is forwarded through the packet switch, e.g. electrical interconnect. Observe that only meta-data, such as request descriptions, are passed through the SLBU. The actual data flows through the two interconnects.

In some cases, it is advantageous to use buffering to aggregate multiple data write requests, as well as to use data caching and predictive data read-ahead to improve performance by increasing the amount of data that can be transferred through the optical switch between reconfigurations. Using two network adapters in each server can eliminate the need for splitters/combiners on the server side. In this case, one of these adapters is connected to the packet switch, e.g. electrical interconnect, and the load balancer, e.g. using Gigabit Ethernet, while the other adapter is connected to the optical switch, e.g. optical interconnect, using optical interface cards such as Fibre Channel. In this case, it is possible to use a server-side driver, e.g. a software package, that collects global data about the requests and sends it to the load balancer, e.g. through Gigabit Ethernet.

Reconfiguration of optical switches can often require a non-negligible amount of time. To improve performance, one embodiment uses more than one optical switch. In this case, the SLBU instructs the splitters/combiners to forward data through interconnects that are already reconfigured, while reconfiguring other interconnects at the same time. This causes reconfiguration intervals of one optical switch, e.g. in the case of an optical interconnect, the interval of time when the optical interconnect is being reconfigured and hence is unavailable for forwarding packets, to overlap the intervals of time when the other interconnect, or interconnects, are already reconfigured and hence can forward the packets. To improve performance, the system supports the connection of a single server to several ports, e.g. by using several network adapters, and the connection of a single storage device to several ports. To reduce cost, the system supports the connection of several servers and/or storage devices to a single port.

A Prediction System Based on an Adaptive Statistical System Model

Computing device requests can be predicted with some degree of accuracy. For example, if a computing device has read the first seven sectors of a 10-sector file in quick succession, it is it quite likely that the computing device will soon request the remaining three sectors. This embodiment of the invention provides a performance enhancement system in the form of a transaction prediction system that predicts future behavior of the computing and storage devices based on prior transactions and known behavior patterns, e.g. the read example discussed above. The system builds and continually adapts a statistical model of the system, for example using a Hidden Markov Model, HMM. The system improves from time to time the statistical model and uses it to enhance the performance of the herein disclosed optical switch by making predictions about the future transactions of the system.

For example, consider a system as shown in FIG. 2, where the computer has read 300 sectors from file X, which contains 350 sectors and resides on Disk A, and then issues a read request for two sectors from file Y, that reside on Disk B. Without a prediction mechanism, the system may choose to reconfigure the optical switch to create a path between the computing device and Disk B. However, it is quite likely that the computing device would soon request the remaining 50 sectors of file X. Therefore, in most cases, better overall throughput and lower latency would be achieved by routing the sectors from file Y through the packet switch, and leaving the optical switch circuit established between storage the computing device and Disk A.

The decision of when to reconfigure the optical switch and how to reconfigure it can be made using, for example, a Markov Decision Process, MDP. In this case, the maintained statistical model is used to predict the expected benefit, e.g. performance improvement, of each possible reconfiguration (or no reconfiguration) at every step and to choose the reconfiguration (or a sequence of reconfigurations) that achieves significant improvement in the sense of mathematical expectation. When preparing the reconfiguration at each step, the system can also take into account possible errors in the predictions of the statistical model, as well as the statistical confidence in the predictions. Performance can also be enhanced by using the adaptive statistical model to predict reads and writes, therefore pre-positioning the disk heads, thereby decreasing latency, and enhancing overall system throughput. In the case where this prediction is implemented in the context of the optical switch, and the actual system behavior differs from the predicted behavior, the packets that have not been predicted can be either temporary buffered in the system and/or routed though the packet switch, thus not incurring the latency penalty that may be imposed by a required reconfiguration of the optical switch.

Dynamically Rearranging Data Stored on the Storage Devices

Using statistical analysis tools such as those mentioned above, another embodiment of the invention detects instances where the data are distributed among the storage devices in a less than optimal way. For example, consider the case where a large video file that is usually accessed sequentially by a single computing device at a time is split among several storage devices connected to several different ports on the system. In this case, it might be advantageous to relocate this file to a single storage device or to plurality of storage devices attached to a single port. Such relocation reduces the number of necessary reconfigurations of the optical switch that are needed for optimum access to the file.

It is important to note that there is a tradeoff in such relocation. While the file is split among several storage devices, it is theoretically possible to access it concurrently from several different computing devices, increasing the overall throughput. On the other hand, this (split) configuration might require extra reconfigurations of the optical switch. Based on the adaptive statistical access model mentioned above, the SLBU uses a decision policy, e.g. based on Markov Decision Process, to analyze these advantages and disadvantages and decides whether to relocate the file and where to relocate it. Note that the use of a file here is an example. A similar approach can be used for relocating sectors, blocks, or regions of data. The approach also can be applied if the storage device uses virtualization to hide its actual physical storage architecture/configuration.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:
1. An apparatus, comprising:
a first set of ports configured to connect a computing device, and a second set of ports configured to connect a storage device comprising data;

a stream-oriented switch operatively connected with the first set of ports and the second set of ports, and a packet switch operatively connected with the first set of ports and the second set of ports;

a scheduling and load balancing unit (SLBU) configured to receive decoded information, the decoded information decoded from a data operation sent from the computing device to access the data of the storage device, the SLBU further configured to use the decoded information to predict whether a future data operation sent from the computing device will be directed to a first data type or directed to a second data type; and a system controller configured to route the future data operation sent from the computing device to the stream-oriented switch in response to predicting the future data operation will be directed to the first data type, the system controller further configured to route the future data operation sent from the computing device to the packet switch in response to predicting the future data operation will be directed to the second data type.

2. The apparatus of claim 1, wherein the stream-oriented switch is an optical switch.

3. The apparatus of claim 1, wherein the first data type comprises a number of bytes greater than a particular number of bytes, and wherein the second data type comprises a number of bytes less than the particular number of bytes.

4. The apparatus of claim 1, wherein the SLBU utilizes a Hidden Markov Model to predict the first data type and the second data type for the future data operation.

5. The apparatus of claim 1, wherein the SLBU utilizes a Markov Decision Process for decisions regarding reconfiguring the stream-oriented switch.

6. The apparatus of claim 1, wherein the first data type is a video file.

7. The apparatus of claim 1, wherein the SLBU is further configured to route predicted data through the stream-oriented switch and route a remainder of data through the packet switch.

8. The apparatus of claim 1, wherein the SLBU is further configured to determine a configuration for the stream-oriented switch in response to predicting the future data operation.

9. The apparatus of claim 1, wherein the SLBU is further configured to optimize a customer-desired system attribute by balancing a frequency of stream-oriented switch reconfigurations.

10. The apparatus of claim 1, wherein the stream-oriented switch is configured to support multiple concurrent circuits.

11. The apparatus of claim 1, further comprising a splitter/combiner configured to communicate with the SLBU.

12. The apparatus of claim 1, further comprising a network adapter configured to communicate with the SLBU.

13. The apparatus of claim 1, further comprising a server-side driver configured to collect global data about the data operation to be sent to the SLBU.

14. The apparatus of claim 1, wherein the SLBU is further configured to instruct the data to be forwarded through an interconnect that is already reconfigured while another interconnect is being reconfigured.

15. A computer-implemented method, comprising:

connecting a first set of ports to a computing device, and connecting a second set of ports to a storage device comprising data;

connecting a stream-oriented switch with the first set ports and the second set of ports, and connecting a packet switch with the first set of ports and the second set of ports;

receiving decoded information from a data operation sent from the computing device to access the data of the storage device;

predicting whether a future data operation sent from the computing device will be a first data type or a second data type using the decoded information; and routing the future data operation sent from the computing device to the stream-oriented switch in response to predicting the future data operation will be the first data type, and routing the future data operation sent from the computing device to the packet switch in response to predicting the future data operation will be the second data type.

16. The method of claim 15, wherein the stream-oriented switch is an optical switch.

17. The method of claim 15, wherein the first data type comprises a number of bytes greater than a particular number of bytes, and wherein the second data type comprises a number of bytes less than the particular number of bytes.

18. The method of claim 15, wherein the predicting comprises utilizing a Hidden Markov Model.

19. The method of claim 15, further comprising utilizing a Markov Decision Process for decisions regarding reconfiguring the stream-oriented switch.

20. The method of claim 15, wherein the first data type is a video file.

21. The method of claim 15, further comprising routing predicted data through the stream-oriented switch and routing a remainder of data through the packet switch.

22. The method of claim 15, further comprising determining a configuration for the stream-oriented switch in response to predicting the future data operation.

23. The method of claim 15, further comprising forwarding data through an interconnect that is already reconfigured while another interconnect is being reconfigured.

24. A non-transitory, tangible computer readable storage device containing executable program instructions executed by a processor, comprising:

program instructions that connect a first set of ports to a computing device, and that connect a second set of ports to a storage device comprising data;

program instructions that connect a stream-oriented switch with the first set of ports and the second set of ports, and program instructions that connect a packet switch with the first set of ports and the second set of ports;

program instructions that receive decoded information from a data operation sent from the computing device to access the data of the storage device;

program instructions that predict whether a future data operation sent from the computing device will be a first data type or a second data type using the decoded information; and program instructions that route the future data operation sent from the computing device to the stream-oriented switch in response to predicting the future data operation will be the first data type, and program instructions that route the future data operation sent from the computing device to the packet switch in response to predicting the future data operation will be the second data type.

* * * * *